United States Patent
Morita et al.

(10) Patent No.: US 11,752,964 B2
(45) Date of Patent: Sep. 12, 2023

(54) DRIVER AIRBAG DEVICE

(71) Applicant: Autoliv Development AB, Vargarda (SE)

(72) Inventors: Kazuki Morita, Kanagawa (JP); Kazuo Yagai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 23 days.

(21) Appl. No.: 17/594,580

(22) PCT Filed: Mar. 24, 2020

(86) PCT No.: PCT/JP2020/013132
§ 371 (c)(1),
(2) Date: Oct. 22, 2021

(87) PCT Pub. No.: WO2020/217824
PCT Pub. Date: Oct. 29, 2020

(65) Prior Publication Data
US 2022/0203920 A1    Jun. 30, 2022

(30) Foreign Application Priority Data
Apr. 25, 2019   (JP) ................... 2019-084758

(51) Int. Cl.
*B60R 21/203* (2006.01)
*B60R 21/2165* (2011.01)
(Continued)

(52) U.S. Cl.
CPC ...... *B60R 21/203* (2013.01); *B60R 21/21656* (2013.01); *B60R 21/2346* (2013.01);
(Continued)

(58) Field of Classification Search
CPC ............ B60R 21/203; B60R 21/21656; B60R 21/2346; B60R 21/261; B60R 2021/23538; B60R 2021/23576; B60R 2021/2612
See application file for complete search history.

(56) References Cited

U.S. PATENT DOCUMENTS 5,913,535 A * 6/1999 Taguchi ............ B60R 21/2346
                                                        280/743.1
6,247,727 B1 * 6/2001 Hamada ............ B60R 21/2338
                                                        280/743.1
(Continued)

FOREIGN PATENT DOCUMENTS

JP    H10226294 A  *  8/1998
JP    2000-85512 A    3/2000
(Continued)

*Primary Examiner* — Laura Freedman
(74) *Attorney, Agent, or Firm* — Foley & Lardner LLP

(57) ABSTRACT

An airbag device, including: a gas generator that generates expansion gas; an airbag that expands and deploys by the expansion gas to restrain an occupant; and a gas rectifying member provided inside the airbag so as to cover the occupant side of the gas generator, and that controls the flow of the expansion gas. The gas rectifying member is formed from a flat panel including a portion bilaterally symmetrical to a line connecting 12 o'clock and 6 o'clock (X axis) when a plane parallel to a rim of the steering wheel is regarded as a clock face, and has a configuration where a lower opening portion for discharging the expansion gas in a 6 o'clock direction is formed by stitching left and right edge portions of the panel together, and the occupant side of the gas generator is covered.

14 Claims, 12 Drawing Sheets

(51) Int. Cl.
*B60R 21/2346* (2011.01)
*B60R 21/235* (2006.01)

(52) U.S. Cl.
CPC .............. *B60R 2021/23538* (2013.01); *B60R 2021/23576* (2013.01)

(56) References Cited

U.S. PATENT DOCUMENTS

| | | | | |
|---|---|---|---|---|
| 6,361,067 B1 * | 3/2002 | Varcus | ................ | B60R 21/2346 280/740 |
| 6,382,662 B1 * | 5/2002 | Igawa | .................. | B60R 21/233 280/729 |
| 6,834,884 B2 * | 12/2004 | Gu | ...................... | B60R 21/2346 280/743.1 |
| 6,848,714 B2 * | 2/2005 | Varcus | ................ | B60R 21/2346 280/743.1 |
| 7,040,655 B2 * | 5/2006 | Igawa | ................ | B60R 21/2346 280/739 |
| 7,195,275 B2 * | 3/2007 | Abe | ...................... | B60R 21/231 280/743.2 |
| 7,445,238 B2 * | 11/2008 | Marriott | ................. | B60R 21/26 280/740 |
| 7,708,305 B2 * | 5/2010 | Ishiguro | ............. | B60R 21/2338 280/743.2 |
| 8,465,049 B2 * | 6/2013 | Tsujimoto | ........... | B60R 21/2346 280/732 |
| 9,199,601 B2 * | 12/2015 | Yamaji | ................. | B60R 21/203 |
| 9,283,921 B2 * | 3/2016 | Vinton | ................ | B60R 21/2346 |
| 9,321,421 B2 * | 4/2016 | Fukawatase | .......... | B60R 21/231 |
| 9,387,822 B2 * | 7/2016 | Iida | .................... | B60R 21/2346 |
| 10,358,110 B2 * | 7/2019 | Ooka | .................. | B60R 21/2346 |
| 10,787,147 B2 * | 9/2020 | Fujimaki | ............. | B60R 21/2338 |
| 11,235,731 B2 * | 2/2022 | Morita | .................. | B60R 21/217 |
| 11,358,561 B2 * | 6/2022 | Ishii | ...................... | B60R 21/217 |
| 11,453,357 B2 * | 9/2022 | Morita | .................. | B60R 21/2338 |
| 11,472,363 B2 * | 10/2022 | Koizumi | ............... | B60R 21/203 |
| 2002/0005639 A1 * | 1/2002 | Varcus | .................. | B60R 21/233 280/743.1 |
| 2003/0201628 A1 * | 10/2003 | Roychoudhury | ... | B60R 21/2346 280/729 |
| 2005/0073139 A1 | 4/2005 | Fischer et al. | | |
| 2006/0232049 A1 * | 10/2006 | Abe | ...................... | B60R 21/233 280/740 |
| 2022/0306034 A1 * | 9/2022 | Ishii | ...................... | B60R 21/2338 |
| 2022/0379832 A1 * | 12/2022 | Abe | ...................... | B60R 21/203 |

FOREIGN PATENT DOCUMENTS

| | | | | |
|---|---|---|---|---|
| JP | 2001-80440 A | | 3/2001 | |
| JP | 2003-320921 A | | 11/2003 | |
| JP | 2006-297958 A | | 11/2006 | |
| JP | 2009113502 A | * | 5/2009 | .......... B60R 21/233 |
| JP | 2011173471 A | * | 9/2011 | |
| JP | 2013154830 A | * | 8/2013 | |
| JP | 2014221577 A | * | 11/2014 | |
| JP | 2018020737 A | * | 2/2018 | |
| JP | 2019038399 A | * | 3/2019 | |

* cited by examiner (A)

(B)

(A)

(B)

DRIVER AIRBAG DEVICE

TECHNICAL FIELD

The present invention relates to an airbag device for a vehicle, and particularly relates to a driver airbag device stored in a steering wheel.

BACKGROUND ART

The provision of a vehicle with one or more airbags in order to protect the occupants thereof in the event of a vehicle accident is well known. These airbags include various forms such as: so-called driver airbags that expand from the vicinity of the steering wheel of an automobile to protect a driver; curtain airbags that deploy in a lower direction on an inner side of a window of an automobile to protect an occupant in the event of an impact in a lateral direction of a vehicle, a rollover, and an overturning accident; side airbags that deploy on a side portion of an occupant (side portion of a seat) to protect the occupant in the event of an impact in a lateral direction of a vehicle; and the like.

In so-called front airbag devices, such as driver airbag devices and passenger seat airbag devices for protecting an occupant in a front passenger seat, the occupant must be restrained by rapid deployment of an airbag, and damage to the occupant who is approaching the airbag must be reduced.

In particular, in a driver airbag system, a situation must be avoided where a driver impacts the steering wheel. Normally, a steering wheel rim is attached in a condition inclined from vertical, such that a lower portion of the steering wheel is closest to the driver side. Therefore, an airbag that deploys from near a center of the steering wheel must quickly deploy toward the vicinity of an abdomen of the driver (downward). In other words, it is required to quickly deploy in a 6 o'clock direction when a surface of the steering wheel is viewed as a clock.

Although airbag devices that are designed to rapidly deploy an airbag toward the lower portion of the steering wheel are present as described above, there are problems where a sufficient effect cannot be achieved, the structure is complicated, and the like.

DISCLOSURE OF THE INVENTION

Problem to be Solved by the Invention

In view of the foregoing, an object of the present invention is to provide an airbag device which, while having a relatively simple structure, can improve the restraining performance of an occupant by appropriately controlling the deployment behavior and shape of an airbag.

Means for Solving the Problem

In order to achieve the object, an airbag device, according to the present invention, is an airbag device stored in a steering wheel of a vehicle, containing: a gas generator that generates expansion gas; an airbag that expands and deploys by the expansion gas to restrain an occupant; and a gas rectifying member provided inside the airbag so as to cover the occupant side of the gas generator, and that controls the flow of the expansion gas.
The gas rectifying member is formed from a flat panel including a portion bilaterally symmetrical to a line connecting 12 o'clock and 6 o'clock (X axis) when a plane parallel to a rim of the steering wheel is regarded as a clock face, and has a configuration where a lower opening portion for discharging the expansion gas in a 6 o'clock direction is formed by stitching left and right edge portions of the panel together, and the occupant side of the gas generator is covered.

Furthermore, when the panel before stitching is virtually divided into four parts by the X-axis and a line connecting 3 o'clock and 9 o'clock (Y-axis) in accordance with an actual installation orientation with regard to the steering wheel, a first opening portion and a second opening portion are respectively formed in an upper right portion region between 12 o'clock and 3 o'clock and in an upper left portion region between 9 o'clock and 12 o'clock.

Herein, "bilaterally symmetrical" means symmetrical with regard to the line connecting the 12 o'clock position and the 6 o'clock position (Y-axis). Furthermore, partially bilaterally symmetrical is also included in addition to being bilaterally symmetrical over an entire range, and moreover, it is not limited to perfectly symmetrical and also includes substantially symmetrical conditions. In the present invention, it is important that the gas rectifying member is easily formed by overlaying one panel along a centerline (Y-axis) and stitching an edge portion. Furthermore, "occupant side" includes a direction orthogonal to a surface including a rim of a steering wheel and a direction slightly inclined from the orthogonal direction.

The 12 o'clock, 3 o'clock, 6 o'clock, and 9 o'clock directions are positions when the steering wheel is regarded as a clock face, but the direction of the steering wheel when the vehicle is traveling straight is the standard, where upward or forward direction is 12 o'clock. Based on the 12 o'clock position, and a position rotated clockwise by 90 degrees is 3 o'clock, a position rotated 180 degrees is 6 o'clock, and a position rotated 270 degrees is 9 o'clock.

With the present invention described above, when the airbag device is activated, gas released from the gas generator flows into the gas rectifying member before the entire airbag is filled. Thereafter, most of the expansion gas flows out of the lower opening portion into the airbag, and some of the expansion gas flows out of the first and second opening portions into the airbag. Therefore, the airbag quickly deploys in the 6 o'clock direction in an initial stage of deployment and enters between the occupant (driver) and the steering wheel to quickly restrain the abdomen of the occupant.

A structure is possible where the lower opening portion is formed as a notch in the panel and an edge portion of the notch is not stitched. The notch forming the lower open portion can be formed into a trapezoidal shape where an edge portion on an opposite side from the 12 o'clock position is wider than an edge portion on a nearer side to the 12 o'clock position in a condition prior to stitching together the left and right edge portions of the panel. Herein, an angle θ between a straight line connecting a lower corner portion of the trapezoidal notch and the connecting part and a straight line in a 3 o'clock to 9 o'clock direction is 110° to 170°, and preferably 120° to 160°.
As a result of experiments by the inventor, a favorable deployment behavior could be achieved by setting the angle θ as described above.

A structure is possible where an upper opening portion for discharging the expansion gas in the 12 o'clock direction is further formed, and the upper opening portion has a smaller opening area than the lower opening portion.

Herein, "opening area" refers to the area of the surface of the gas rectifying member after stitching the left and right edge portions together, which is closed by the edge portion of a portion to be opened in a condition where the gas rectifying member is completely deployed. This surface formed by closing may be configured from at least one of a planar shape, a curved shape, a composite shape thereof, or the like, which also includes cases where the shape itself is bent. Note that when the term "area of the opening portion" is used, the same meaning applies.

The gas rectifying member and the airbag can be mutually connected at a connecting part in the vicinity of an outer periphery of the gas generator.

The areas of the first and second opening portion are preferably smaller than the opening area of the lower opening portion. The area of the first and second opening portions can be between 840 mm² and 4800 mm².

A structure is possible where a cover that covers a surface of the stored airbag on the occupant side is provided, the cover has a structure that is opened when the airbag is deployed, and at least a portion of the first and second opening portions, when the airbag is deployed, is at a position protruding more to the occupant side than a surface of the cover.

A structure is possible where a cover that covers a surface of the stored airbag on the occupant side is provided, the cover has a structure that is opened when the airbag is deployed, and at least a portion of the lower opening portion, when the airbag is deployed, is at a position protruding more to the occupant side than a surface of the cover.

By adopting such a structure, a force of pushing the cover up is maximized until the cover is opened by the deployment of the airbag, and after the cover is opened, the gas rectifying member exerts an original function to appropriately control the gas flow.

The airbag can contain: a front panel positioned on the occupant side; a back panel positioned on the gas generator side; and a side panel connecting the front panel and the back panel. Furthermore, misalignment in a Y-axis direction between a center position of the front panel of the airbag in a stored condition and a center position of the gas rectifying member is preferably ±30 mm or less when the 3 o'clock to 9 o'clock direction is the Y-axis direction. Similarly, misalignment in an X-axis direction between a center position of the front panel of the airbag in a stored condition and a center position of the gas rectifying member is preferably ±30 mm or less when the 12 o'clock to 6 o'clock direction is the X-axis direction.

The gas rectifying member is preferably disposed so as to be in contact with the front panel in the condition where the airbag is stored.

DESCRIPTION OF THE PREFERRED EMBODIMENT

Figure 1:
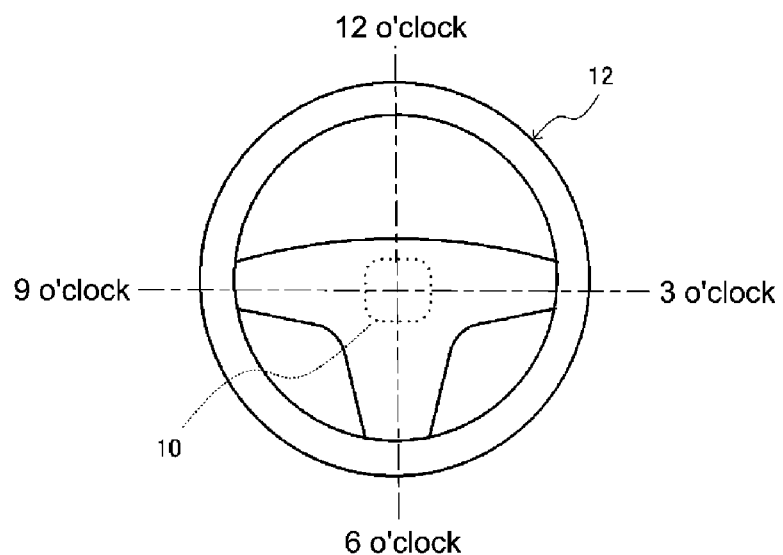
FIG. 1 is a plan view illustrating an external shape of a steering wheel to which an airbag device according to the present invention can be applied.
Figure 2:
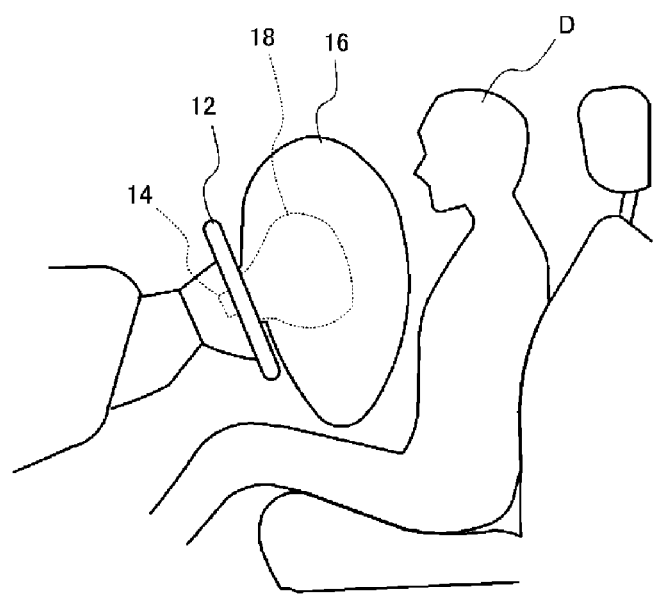
FIG. 2 is a side surface view illustrating a condition where the airbag device according to the present invention is activated and an airbag is deployed.

An airbag device according to embodiments of the present invention will be described below with reference to the accompanying drawings. FIG. 1 is a plan view illustrating an external shape of a steering wheel 12, to which an airbag device 10 according to the present invention can be applied. FIG. 2 is a side surface view illustrating a condition where the airbag device 10 according to the present invention is activated and an airbag 16 is deployed. The airbag device 10 according to the present invention is stored in the vicinity of a center of the steering wheel 12. Note that "12 o'clock", "3 o'clock", "6 o'clock", and "9 o'clock" correspond to positions that indicate the time on a clock when the steering wheel (or a plane orthogonal to a deploying direction of the airbag) is viewed from a driver side.

The airbag device 10 according to the present invention contains: a gas generator 14 that generates expansion gas; the airbag 16 that expands and deploys by the expansion gas to restrain an occupant; and a gas rectifying member 18 provided inside the airbag 16 so as to cover an occupant D side of the gas generator, and that controls the flow of the expansion gas.

Figure 3:
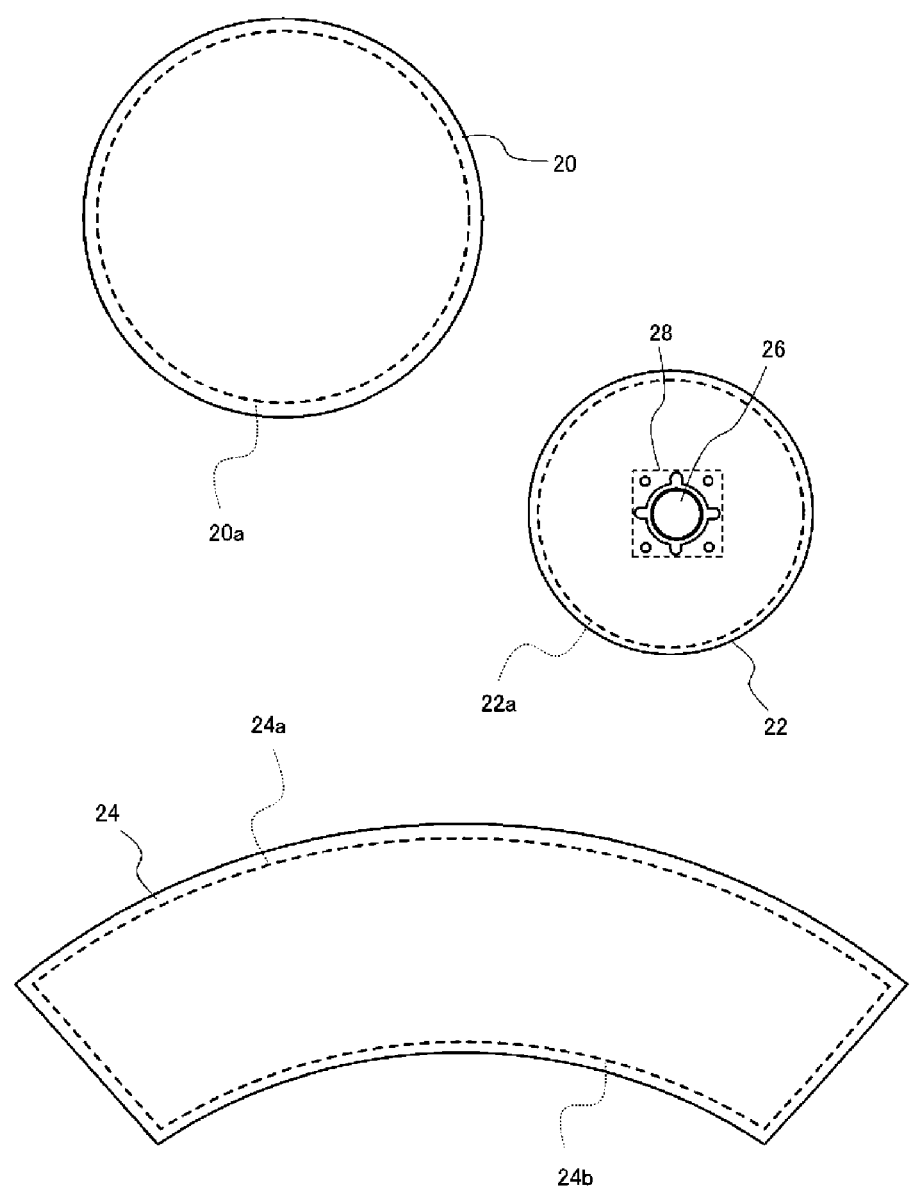
FIG. 3 is a plan view illustrating a panel structure of an airbag used in an airbag device according to Embodiment 1 of the present invention.

FIG. 3 is a plan view illustrating a panel structure of the airbag 16 used in an airbag device 10 according to Embodiment 1 of the present invention. The airbag 16 is configured from: a circular front panel 20 positioned on the occupant D side; a circular back panel 22 positioned on the gas generator 14 side; and a side panel 24 connected to outer circumferences of the front panel 20 and the back panel 22. The front panel 20 is formed to be larger than the back panel 22.

An outer circumferential stitched portion 20a of the front panel 20 is connected by stitching to a stitched portion 24a of the side panel 24, and the outer circumferential stitched portion 22a of the back panel 22 is connected by stitching to the a stitched portion 24b of the side panel 24.

A connecting hole 26 into which the gas generator 14 is inserted is formed in a center of the back panel 22. Furthermore, a connecting part 28 with the rectifying member 18 is formed on an outer side of the connecting hole 26.

Figure 4:
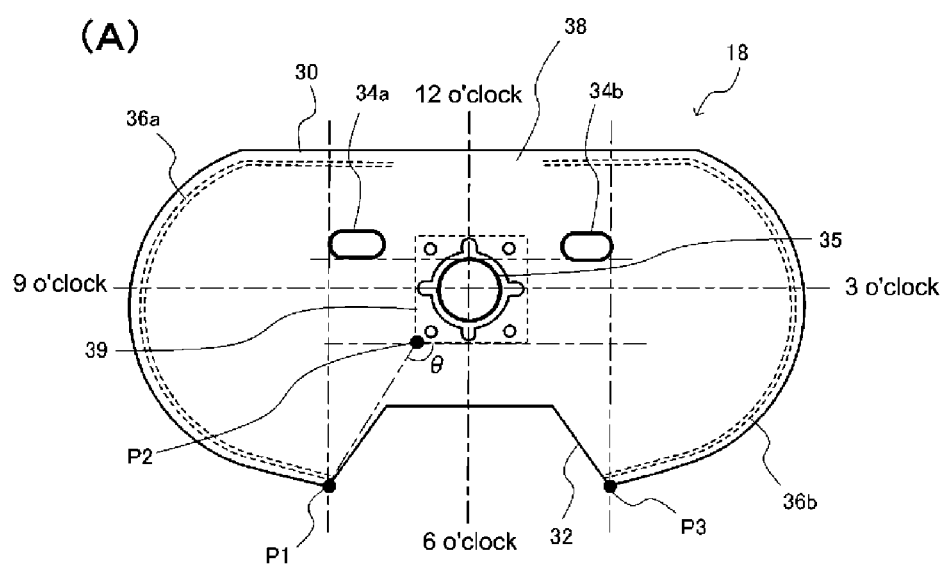
FIG. 4 is a plan view illustrating a panel structure of a gas rectifying member used in the airbag device according to Embodiment 1 of the present invention.
Figure 4:
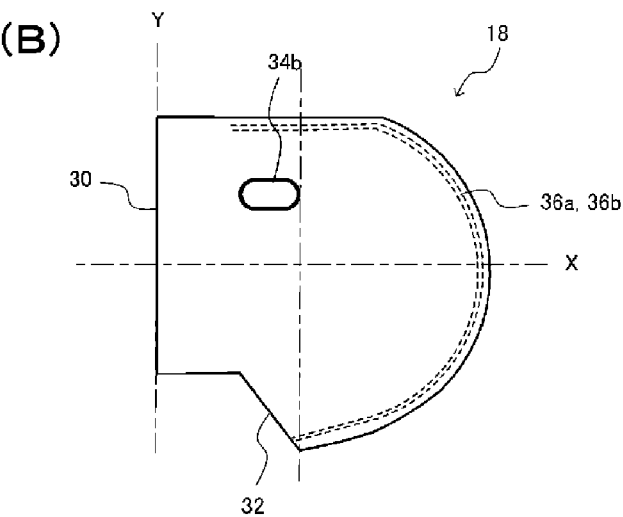

FIG. 4 is a plan view illustrating a panel structure of the rectifying member 18 used in the airbag device 10 according to Embodiment 1 of the present invention. In FIG. 4, (A) illustrates a panel 30 prior to stitching, and (B) illustrating the panel 30 in a stitched condition.

As illustrated in FIG. 4(A), the gas rectifying member 18 is formed from the bilaterally symmetrical panel 30, and a lower opening portion 32 that discharges the expansion gas in a direction of 6 o'clock is formed when a plane parallel to the rim of the steering wheel 12 is viewed as a clock face. Furthermore, left and right edge portions of the panels 30 are stitched (36a, 36b) together so as to cover the occupant D side of the gas generator 14 (see FIG. 6).

Herein, "bilaterally symmetrical" means bilaterally symmetrical with regard to the line connecting the 12 o'clock position and the 6 o'clock position (Y-axis). Furthermore, "occupant side" includes a direction orthogonal to a surface including a rim of the steering wheel 12 and a direction slightly inclined from the orthogonal direction.

As illustrated in FIG. 4(A), when the flat panel 30 prior to stitching is virtually divided into four parts by a line (Y-axis) connecting 12 o'clock and 6 o'clock and a line (X-axis) connecting 3 o'clock and 9 o'clock (Y-axis) in accordance with an actual installation orientation with regard to the steering wheel 12, an oval first opening portion 34b and second opening portion 34a are respectively formed in an upper right portion region between 12 o'clock and 3 o'clock and in an upper left portion region between 9 o'clock and 12 o'clock.

The area of the first and second opening portions 34b, 34a can be smaller than the area of the lower opening portion 32 (area of a notched portion), for example, 840 mm$^2$ to 4800 mm$^2$.

Note that as described above, the 12 o'clock, 3 o'clock, 6 o'clock, and 9 o'clock directions are positions when the steering wheel is regarded as a clock face, but the direction of the steering wheel when the vehicle is traveling straight is the standard, where upward or forward direction is 12 o'clock. Based on the 12 o'clock position, a position rotated clockwise by 90 degrees is 3 o'clock, a position rotated by 180 degrees is 6 o'clock, and a position rotated by 270 degrees is 9 o'clock.

A connecting hole 35 into which the gas generator 14 is inserted is formed in a center of the panel 30 forming the gas rectifying member 18. Furthermore, a connecting part 39 with the back 22 is formed on an outer side of the connecting hole 35.

Figure 6:
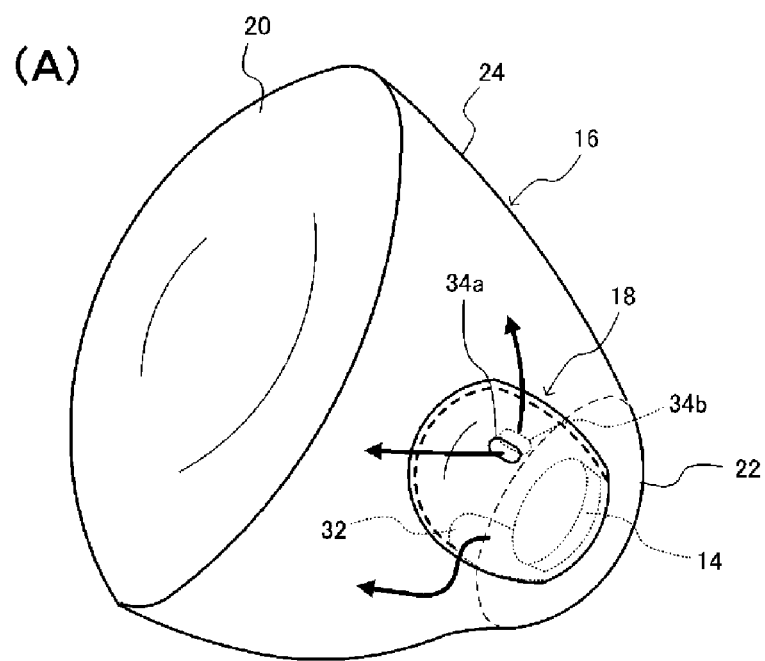
FIG. 6(A) is a perspective view illustrating a condition where the airbag according to Embodiment 1 of the present invention is deployed.
FIG. 6(B) is an enlarged portion of (A).
Figure 6:
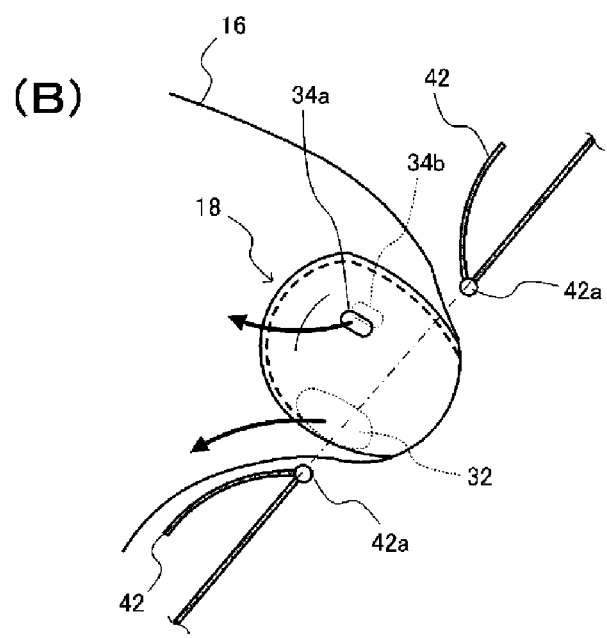
Figure 10:
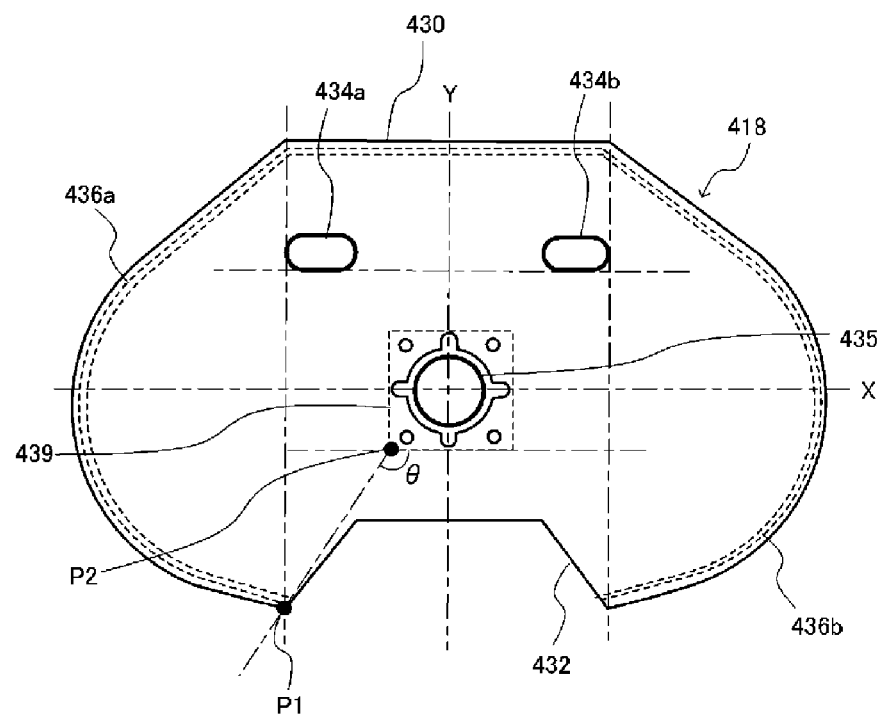
FIG. 10 is a plan view illustrating a panel structure of a gas rectifying member used in an airbag device according to Embodiment 5 of the present invention.
Figure 12:
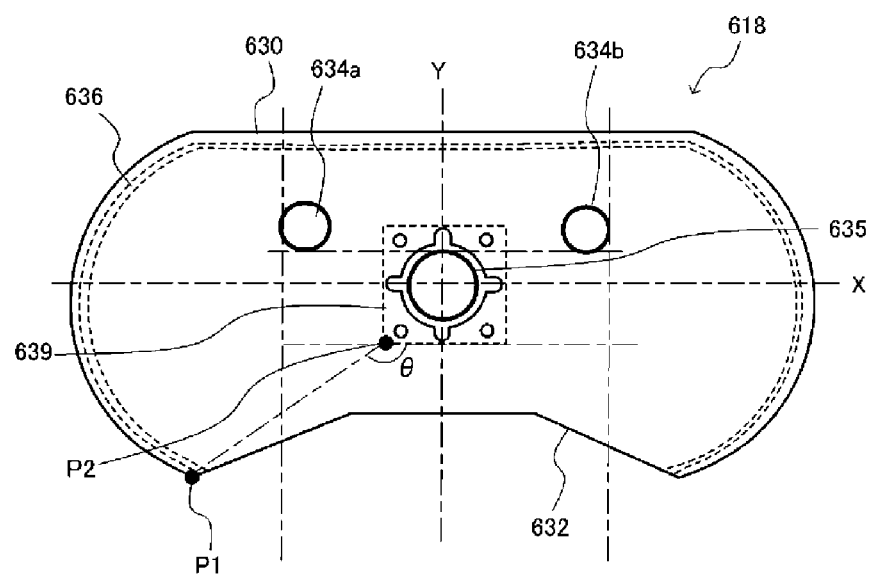
FIG. 12 is a plan view illustrating a panel structure of a gas rectifying member used in an airbag device according to Embodiment 7 of the present invention.
Figure 12:
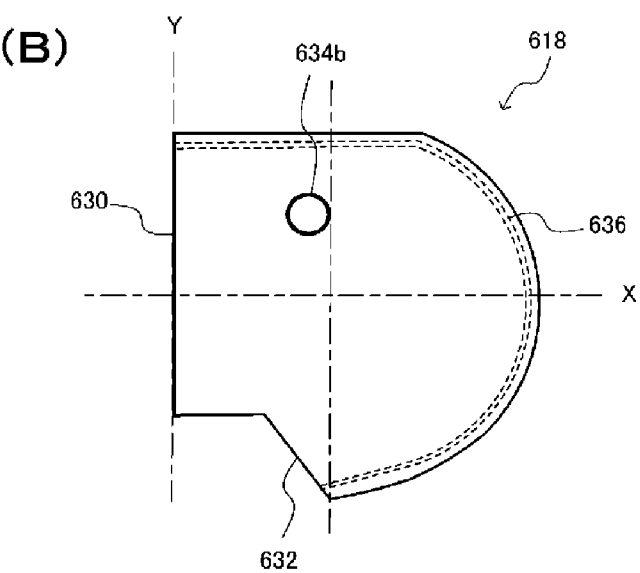

The lower opening portion 32 of the panel 30 is formed as a notch, and an edge portion of the notch 32 is not stitched. Herein, the notch forming the lower opening portion 32 is formed in a trapezoidal shape with a wide edge portion on an opposite side from the 12 o'clock position. Furthermore, in the 12 o'clock direction of the gas rectifying member 18 (panel 30), an upper opening portion 38 can be formed with an opening area smaller than the lower opening portion 32. However, as illustrated in FIGS. 6, 10, and 12, an upper portion can also be closed by stitching without forming the upper opening portion 38.

The gas rectifying member 18 and the back panel 22 of the airbag 16 are mutually connected at connecting parts (28, 39) near the vicinity of an outer periphery of the gas generator 14. Furthermore, an angle θ between a straight line connecting a lower corner portion P1 of the trapezoidal notch 32 and a closest position P2 of the connecting part 39 and a straight line (X-axis) in the 3 o'clock to 9 o'clock direction is 110° to 170°, and preferably 120° to 160°. As a result of experiments by the inventor, a favorable deployment behavior could be achieved by setting the angle θ as described above.

In FIG. 4(A) and (B), the panel 30 is folded over along the Y-axis (12 o'clock to 6 o'clock direction) passing through the center and stitched along stitching lines 36a, 36b.

Figure 5:
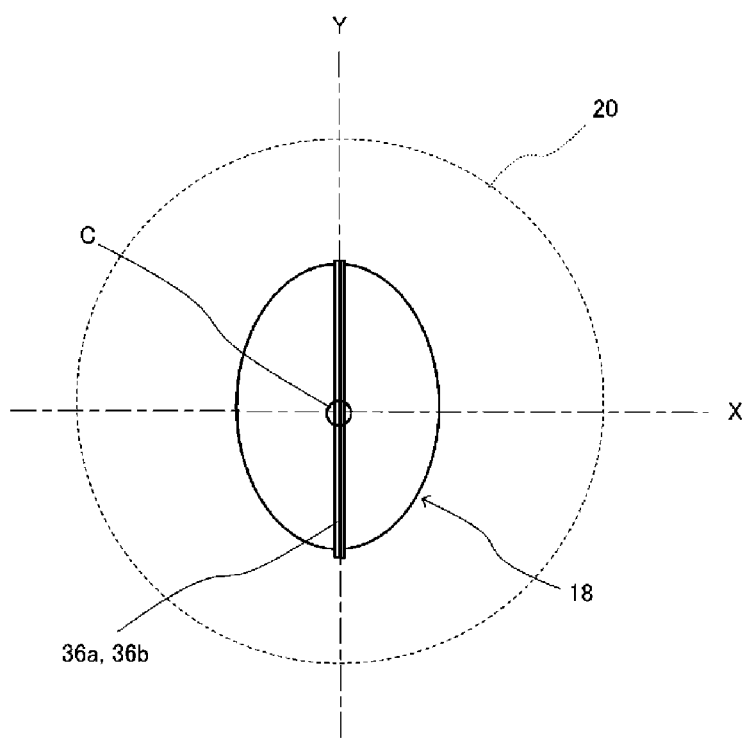
FIG. 5 is a front surface view illustrating a positional relationship between a front panel and the gas rectifying member of the airbag according to Embodiment 1 of the present invention, and illustrates a view (partial perspective) of the deployed airbag from a driver side

FIG. 5 is a front surface view illustrating a positional relationship between the front panel 20 and the gas rectifying member 18 of the airbag 16, and illustrates a view (partial perspective) of the deployed airbag 16 from the driver D side. Herein, when the 3 o'clock to 9 o'clock direction is defined as an X direction and the 12 o'clock to 6 o'clock direction is defined as a Y direction, a center position of the front panel 20 of the airbag 16 in the stored condition and a center position C of the gas rectifying member 18 preferably coincide with each other, and deviations in the X direction and Y direction are at least ±30 mm or less, respectively.

In the condition where the airbag 16 is stored, the gas rectifying member 18 is folded and stored so as to be in contact with the front panel 20.

FIG. 6(A) is a perspective view illustrating a condition where the airbag 16 according to Embodiment 1 of the present invention is deployed, and FIG. 6(B) is an enlarged portion of (A). As illustrated in FIG. 6(B), a cover 42 is provided on the occupant D side of the airbag 16 in the stored condition, which opens with a hinge 42a as a fulcrum when the airbag 16 is deployed.

At least a portion of the first and second opening portions 34b, 34a is configured so as to come to a position protruding more toward the occupant D side than a surface of the cover 42 (hinge 42a) when the airbag 16 is deployed. Furthermore, similarly for the lower opening portion 32, at least a portion of the lower opening portion 32 is configured so as to come to a position protruding more toward the occupant D side than a surface of the cover 42 (hinge 42a) when the airbag 16 is deployed. By adopting such a structure, a force of pushing the cover 42 up is maximized until the cover 42 is opened by the deployment of the airbag 16, and after the cover 42 is opened, the gas rectifying member 18 exerts an original function to appropriately control the gas flow.

According to the embodiments described above, when the airbag device 10 is activated, gas released from the gas generator 14 flows into the gas rectifying member 18 before the entire airbag 16 is filled. Thereafter, most of the expansion gas flows out of the lower opening portion 32 into the airbag 16, and some of the expansion gas flows out of the first opening portion 34b and second opening portion 34a into the airbag 16. Therefore, the airbag 16 quickly deploys in the 6 o'clock direction in an initial stage of deployment and enters between the occupant (driver D) and the steering wheel 12 to quickly restrain the abdomen of the occupant D.

Embodiment 2 to Embodiment 6 of the present invention will be described below. However, the panel structure of the gas rectifying member 18 of Embodiment 1 described above is modified in all of these embodiments, and therefore, only differences from Embodiment 1 will be described. In other words, for components corresponding to Embodiment 1 described above, the last two digits are the same code and only a third digit is changed. Moreover, in the case of generally identical functions and structures, redundant descriptions are omitted.

Figure 7:
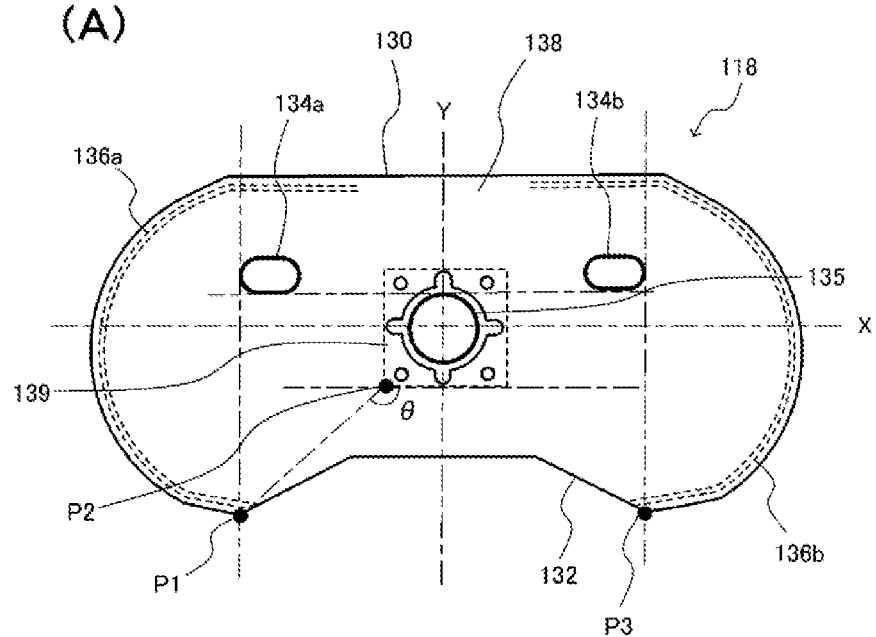
FIG. 7 is a plan view illustrating a panel structure of a gas rectifying member used in an airbag device according to Embodiment 2 of the present invention.
Figure 7:
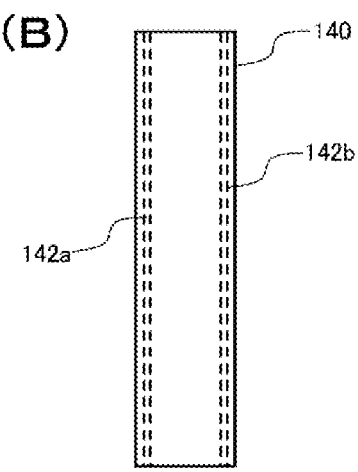

FIG. 7 is a plan view illustrating a structure of a panel 130 of a gas rectifying member 118 used in an airbag device according to Embodiment 2 of the present invention. In the present embodiment, a trapezoidal shape of a lower opening portion 132 is horizontally long, and the angle θ is larger than in Embodiment 1. Furthermore, a single panel 140 is interposed between left and right edge portions 136a, 136b of the panel 130 to increase the thickness in the X-axis direction as the gas rectifying member 118.

Figure 8:
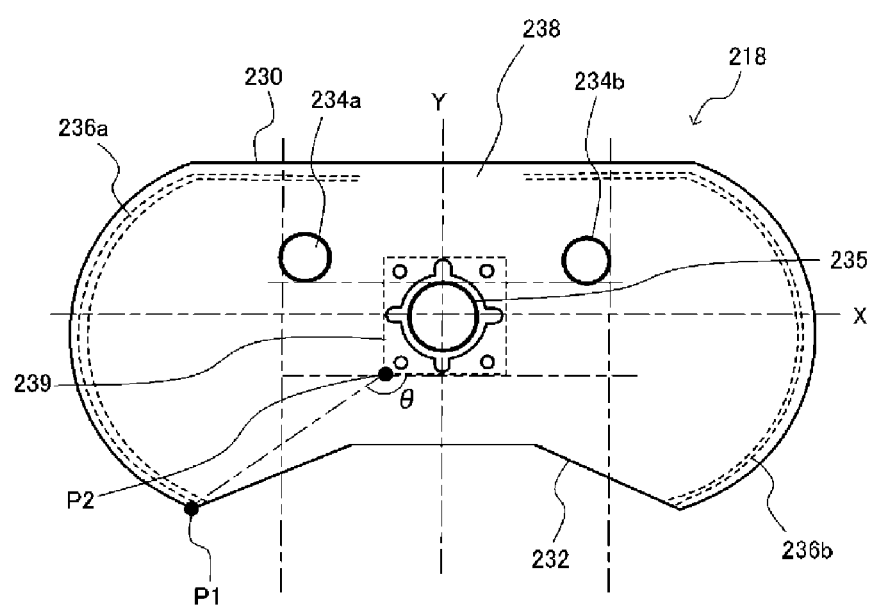
FIG. 8 is a plan view illustrating a panel structure of a gas rectifying member used in an airbag device according to Embodiment 3 of the present invention.

FIG. 8 is a plan view illustrating a structure of a panel 230 of a gas rectifying member 218 used in an airbag device according to Embodiment 3 of the present invention. In the present embodiment, similar to Embodiment 2, a trapezoidal shape of a lower opening portion 232 is horizontally long, and the angle θ is larger than in Embodiment 1. Furthermore, first and second opening portions 234b, 234a are not elliptical, but are completely circular.

Figure 9:
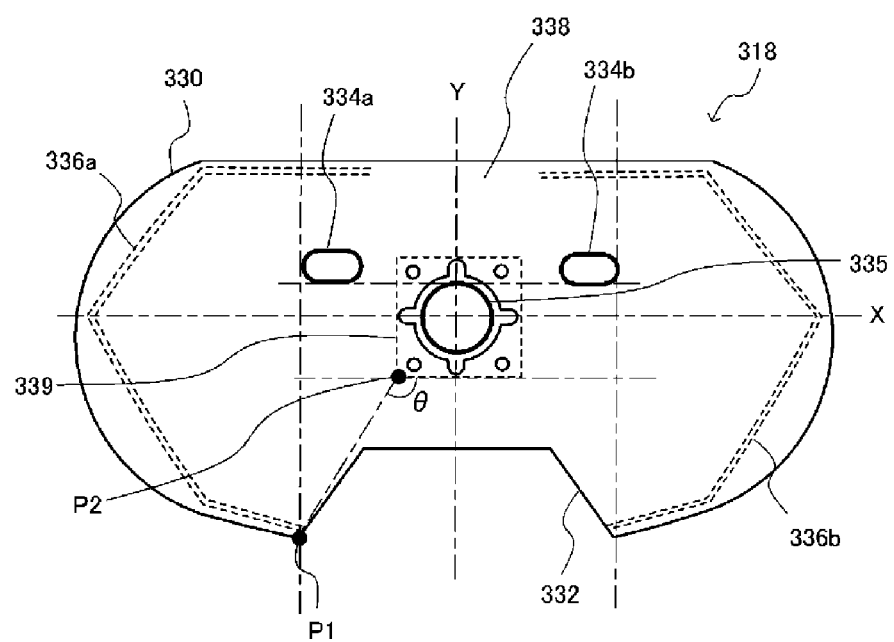
FIG. 9 is a plan view illustrating a panel structure of a gas rectifying member used in an airbag device according to Embodiment 4 of the present invention.

FIG. 9 is a plan view illustrating a structure of a panel 330 of a gas rectifying member 318 used in an airbag device according to Embodiment 4 of the present invention. In the present embodiment, the shape of the panel 330 itself is completely identical to Embodiment 1, but stitching lines 336a, 336b are formed only in straight lines instead of curved lines.

FIG. 10 is a plan view illustrating a structure of a panel 430 of a gas rectifying member 418 used in an airbag device according to Embodiment 5 of the present invention. In the present embodiment, a panel 430 with an external shape different from other embodiments is employed, and a length (height) in the Y direction is relatively large. Therefore, when the airbag 16 is deployed, first and second opening portions 434b, 434a protrude further to the occupant D side than the cover 42 (see FIG. 6).

Figure 11:
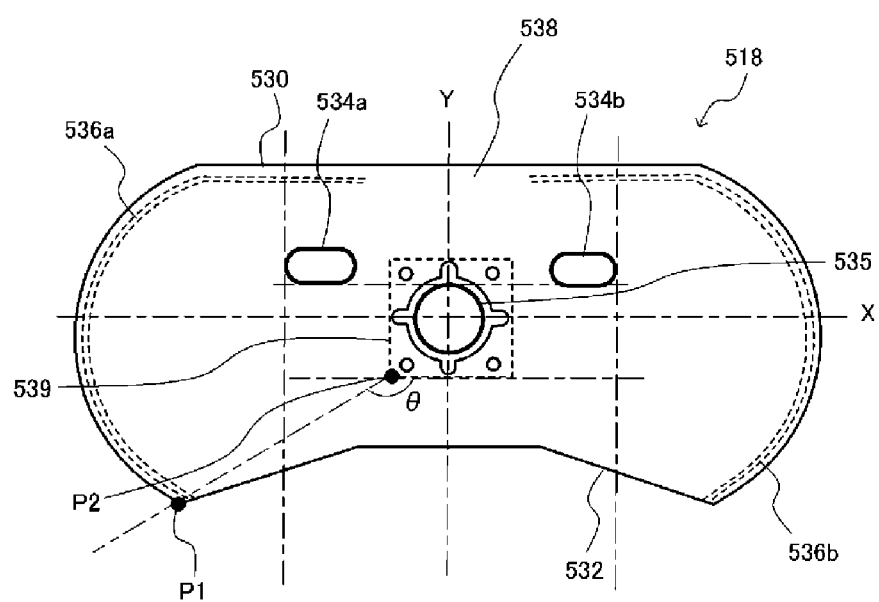
FIG. 11 is a plan view illustrating a panel structure of a gas rectifying member used in an airbag device according to Embodiment 6 of the present invention.

FIG. 11 is a plan view illustrating a structure of a panel 530 of a gas rectifying member 518 used in an airbag device according to Embodiment 6 of the present invention. In the present embodiment, unlike the other embodiments, a lower opening portion 532 is formed in an extremely horizontally long manner, and thus the angle θ is very large. Therefore, the opening area of the lower opening portion 532 formed after stitching is increased.

FIG. 12 is a plan view illustrating a panel structure of a gas rectifying member 618 used in an airbag device according to Embodiment 7 of the present invention. In FIG. 12, (A) illustrates a panel 630 prior to stitching, and (B) illustrates the panel 630 in a stitched condition. The present embodiment is similar to Embodiment 3 illustrated in FIG. 8, with the only difference being a stitching point 636 on an outer periphery of the panel 630.

In the present embodiment, the stitching line 636 on an outer peripheral portion of the panel 630 is continuous and uninterrupted at the 12 o'clock position. Therefore, as illustrated in (B) of the drawing, the 12 o'clock side (upper portion) of the gas rectifying member 618 after stitching is completely closed. Furthermore, as a result, the expansion gas released from the inflator will flow out into an interior of the airbag only from a lower opening portion 632 and first and second opening portions 634b, 634a.

Embodiments of the present invention have been described above. However, the present invention is in no way limited by these embodiments and may be changed within a scope of technical ideas set forth in the patent claims.

What is claimed is:

1. An airbag device stored in a steering wheel of a vehicle, comprising:
    a gas generator that generates expansion gas;
    an airbag configured to restrain an occupant by expanding and deploying by the expansion gas; and
    a gas rectifying member provided so as to cover an occupant side of the gas generator inside the airbag and that controls a flow of the expansion gas;
    wherein the gas rectifying member is formed from a flat panel including a portion bilaterally symmetrical to a line connecting 12 o'clock and 6 o'clock (X axis) when a plane parallel to a rim of the steering wheel is regarded as a clock face, and has a configuration where a lower opening portion for discharging the expansion gas in a 6 o'clock direction is formed by stitching left and right edge portions of the panel together, covering the occupant side of the gas generator, wherein the lower opening portion is formed as a notch in the panel and an edge portion of the notch is not stitched, and
    wherein the panel before stitching is virtually divided into four parts by the X-axis and a line connecting 3 o'clock and 9 o'clock (Y-axis) in accordance with an actual installation orientation with regard to the steering wheel, a first opening and a second opening are respectively formed in an upper right portion region between 12 o'clock and 3 o'clock and in an upper left portion region between 9 o'clock and 12 o'clock.

2. The airbag device according to claim 1, wherein the notch forming the lower opening portion is formed into a trapezoidal shape where an edge portion on an opposite side from the 12 o'clock position is wider than an edge portion on a nearer side to the 12 o'clock position in a condition prior to stitching together the left and right edge portions of the panel.

3. The airbag device according to claim 2, wherein an angle θ between a straight line connecting a lower corner portion of the trapezoidal notch and a connecting part and a straight line in a 3 o'clock to 9 o'clock direction is 110° to 170°.

4. The airbag device according to claim 3, wherein the angle θ is 120° to 160°.

5. The airbag device according to claim 1, wherein the gas rectifying member and the airbag are mutually connected at a connecting part in the vicinity of an outer periphery of the gas generator.

6. The airbag device according to claim 1, wherein an area of the first and second openings is smaller than an opening area of the lower opening portion.

7. The airbag device according to claim 1, wherein an area of the first and second openings is 840 mm$^2$ to 4800 mm$^2$.

8. The airbag device according to claim 1, wherein a cover that covers a surface of the stored airbag on the occupant side is provided, the cover has a structure that is opened when the airbag is deployed, and at least a portion of the first and second openings, when the airbag is deployed, is at a position protruding more to the occupant side than a surface of the cover.

9. The airbag device according to claim 1, wherein the airbag contains: a front panel positioned on the occupant side; a back panel positioned on a gas generator side; and a side panel connecting the front panel and the back panel.

10. The airbag device according to claim 9, wherein misalignment in a Y-axis direction between a center position of the front panel of the airbag in a stored condition and a center position of the gas rectifying member is ±30 mm or less when the 3 o'clock to 9 o'clock direction is the Y-axis direction.

11. The airbag device according to claim 9, wherein misalignment in a X-axis direction between a center position of the front panel of the airbag in a stored condition and a center position of the gas rectifying member is ±30 mm or less when the 12 o'clock to 6 o'clock direction is the X-axis direction.

12. The airbag device according to claim 9, wherein the gas rectifying member is disposed so as to be in contact with the front panel in the condition where the airbag is stored.

13. An airbag device stored in a steering wheel of a vehicle, comprising:
- a gas generator that generates expansion gas;
- an airbag configured to restrain an occupant by expanding and deploying by the expansion gas; and
- a gas rectifying member provided so as to cover an occupant side of the gas generator inside the airbag and that controls a flow of the expansion gas;
- wherein the gas rectifying member is formed from a flat panel including a portion bilaterally symmetrical to a line connecting 12 o'clock and 6 o'clock (X axis) when a plane parallel to a rim of the steering wheel is regarded as a clock face, and has a configuration where a lower opening portion for discharging the expansion gas in a 6 o'clock direction is formed by stitching left and right edge portions of the panel together, covering the occupant side of the gas generator, and
- wherein the panel before stitching is virtually divided into four parts by the X-axis and a line connecting 3 o'clock and 9 o'clock (Y-axis) in accordance with an actual installation orientation with regard to the steering wheel, a first opening and a second opening are respectively formed in an upper right portion region between 12 o'clock and 3 o'clock and in an upper left portion region between 9 o'clock and 12 o'clock, wherein an upper opening portion for discharging the expansion gas in the 12 o'clock direction is further formed, and the upper opening portion has a smaller opening area than the lower opening portion.

14. An airbag device stored in a steering wheel of a vehicle, comprising:
- a gas generator that generates expansion gas;
- an airbag configured to restrain an occupant by expanding and deploying by the expansion gas; and
- a gas rectifying member provided so as to cover an occupant side of the gas generator inside the airbag and that controls a flow of the expansion gas;
- wherein the gas rectifying member is formed from a flat panel including a portion bilaterally symmetrical to a line connecting 12 o'clock and 6 o'clock (X axis) when a plane parallel to a rim of the steering wheel is regarded as a clock face, and has a configuration where a lower opening portion for discharging the expansion gas in a 6 o'clock direction is formed by stitching left and right edge portions of the panel together, covering the occupant side of the gas generator, and
- wherein the panel before stitching is virtually divided into four parts by the X-axis and a line connecting 3 o'clock and 9 o'clock (Y-axis) in accordance with an actual installation orientation with regard to the steering wheel, a first opening and a second opening are respectively formed in an upper right portion region between 12 o'clock and 3 o'clock and in an upper left portion region between 9 o'clock and 12 o'clock, wherein a cover that covers a surface of the stored airbag on the occupant side is provided,
- the cover has a structure that is opened when the airbag is deployed, and at least a portion of the lower opening portion, when the airbag is deployed, is at a position protruding more to the occupant side than a surface of the cover.

* * * * *